(12) United States Patent
Friend et al.

(10) Patent No.: US 12,741,833 B2
(45) Date of Patent: Sep. 22, 2026

(54) TUGGER DOCKING PLATE FOR ONE TOUCH DELIVERY

(71) Applicant: TOYOTA MOTOR ENGINEERING & MANUFACTURING NORTH AMERICA, INC., Plano, TX (US)

(72) Inventors: Ronald Scott Friend, Jeffersonville, KY (US); Brian Mcelroy, Winchester, KY (US); Robert Aaron Allex, Ewing, KY (US); David A. Britton, Florence, KY (US); Billy D. Dooley, Irvine, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 17/875,284

(22) Filed: Jul. 27, 2022

(65) Prior Publication Data

US 2024/0034576 A1 Feb. 1, 2024

(51) Int. Cl.
*B65G 69/00* (2006.01)
*B60P 1/64* (2006.01)
*B60P 3/00* (2006.01)

(52) U.S. Cl.
CPC .......... *B65G 69/003* (2013.01); *B60P 1/6418* (2013.01); *B60P 3/007* (2013.01)

(58) Field of Classification Search
CPC .. B65G 69/003; B65G 69/006; B65G 69/001; B65G 69/005; B60P 1/6418; B60P 3/007; B60P 3/075; B60P 3/077; B60P 3/073; B60P 3/42; B60P 3/1041; B62D 21/20; B62D 63/061; E01F 9/588; E01F 9/529; E01F 9/50; E01F 9/535; E01F 9/541; E01F 9/553; E01F 15/085
USPC .......... 404/7, 9, 15; 414/234, 235, 240, 242, 414/253
See application file for complete search history.

(56) References Cited

U.S. PATENT DOCUMENTS 6,170,341 B1 1/2001 Avitan
6,276,496 B1 * 8/2001 Hageman ............. B65G 69/005 414/401
6,357,987 B1 * 3/2002 Palus .................. B65G 69/005 188/32
6,993,799 B2 2/2006 Foster
9,550,444 B1 * 1/2017 Ferreira ................. B60P 3/077
(Continued)

*Primary Examiner* — Glenn F Myers
(74) *Attorney, Agent, or Firm* — SHEPPARD, MULLIN, RICHTER & HAMPTON LLP; Daniel N. Yannuzzi

(57) ABSTRACT

A docking plate apparatus is provided for motorized floor conveyor vehicles, such as conveyance tuggers, that is particularly structured to provide tactile feedback at a determined stop position for improved docking and/or stopping placement. The docking plate apparatus has a structure and dimensions to ensure that the motorized floor conveyor vehicle is docked exactly in a determined stop position that is deemed most optimal for interaction with a delivery system. The docking plate apparatus can comprise body, which is a flat panel structure, and a docking aperture that is structured in a portion of the body. The docking aperture receiving at least one wheel of a motorized floor conveyor vehicle to dock the motorized vehicle in a determined stop position for interaction with the delivery system.

20 Claims, 4 Drawing Sheets

(56) References Cited

U.S. PATENT DOCUMENTS

| | | | | |
|---|---|---|---|---|
| 10,238,944 | B1 * | 3/2019 | Turchyn | A63B 63/083 |
| 10,661,696 | B2 | 5/2020 | Borders | |
| 10,857,925 | B1 * | 12/2020 | Sahota | G05D 1/0011 |
| 2007/0116514 | A1 * | 5/2007 | Woytowich | E01F 9/529<br>404/7 |
| 2016/0144906 | A1 * | 5/2016 | Han | B60D 1/62<br>180/14.2 |
| 2017/0044817 | A1 * | 2/2017 | McNeill | B65G 69/005 |
| 2022/0242299 | A1 * | 8/2022 | Seale | B60T 3/00 |
| 2022/0258630 | A1 * | 8/2022 | Paterson | B60L 53/65 |

* cited by examiner

TUGGER DOCKING PLATE FOR ONE TOUCH DELIVERY

TECHNICAL FIELD

The present disclosure relates generally to a mechanical docking apparatus for a floor conveyor vehicle, such as a tugger, which provides improved accuracy with respect to the vehicle's stop and/or park positioning.

DESCRIPTION OF RELATED ART

Tuggers, also referred to as conveyance tuggers, tugger trains, and tugger tractors, are motorized vehicles that are typically used as a means of transport for internal horizontal material transport in plannable, standardized intralogistics processes. Tuggers are a type of motorized floor conveyor vehicles that primarily supply production and/or assembly with production equipment from the warehouse. Tuggers are designed to transport several load carriers per trip, and compared to other industrial trucks, can achieve enormous increases in productivity in horizontal material transport while at the same time minimizing the internal traffic volume. Thus, motorized floor conveyance vehicles, such as tugger trains, are an economical and safe solution for internal horizontal material flows.

BRIEF SUMMARY OF THE DISCLOSURE

In accordance with an embodiment of the disclosed technology, a docking plate apparatus for motorized floor conveyor vehicles, such as conveyance tuggers, is described to be particularly structured to provide tactile feedback in a determined stop position for improved docking and/or stopping placement.

In accordance with an embodiment of the disclosed technology, the docking plate apparatus comprises a body, wherein the body comprises a flat panel structure. The docking plate apparatus further comprises a docking aperture structured in a portion of the body, wherein the docking aperture receives at least one wheel of a motorized floor conveyor vehicle to dock the motorized floor conveyor vehicle in a determined stop position for interaction with a delivery system.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
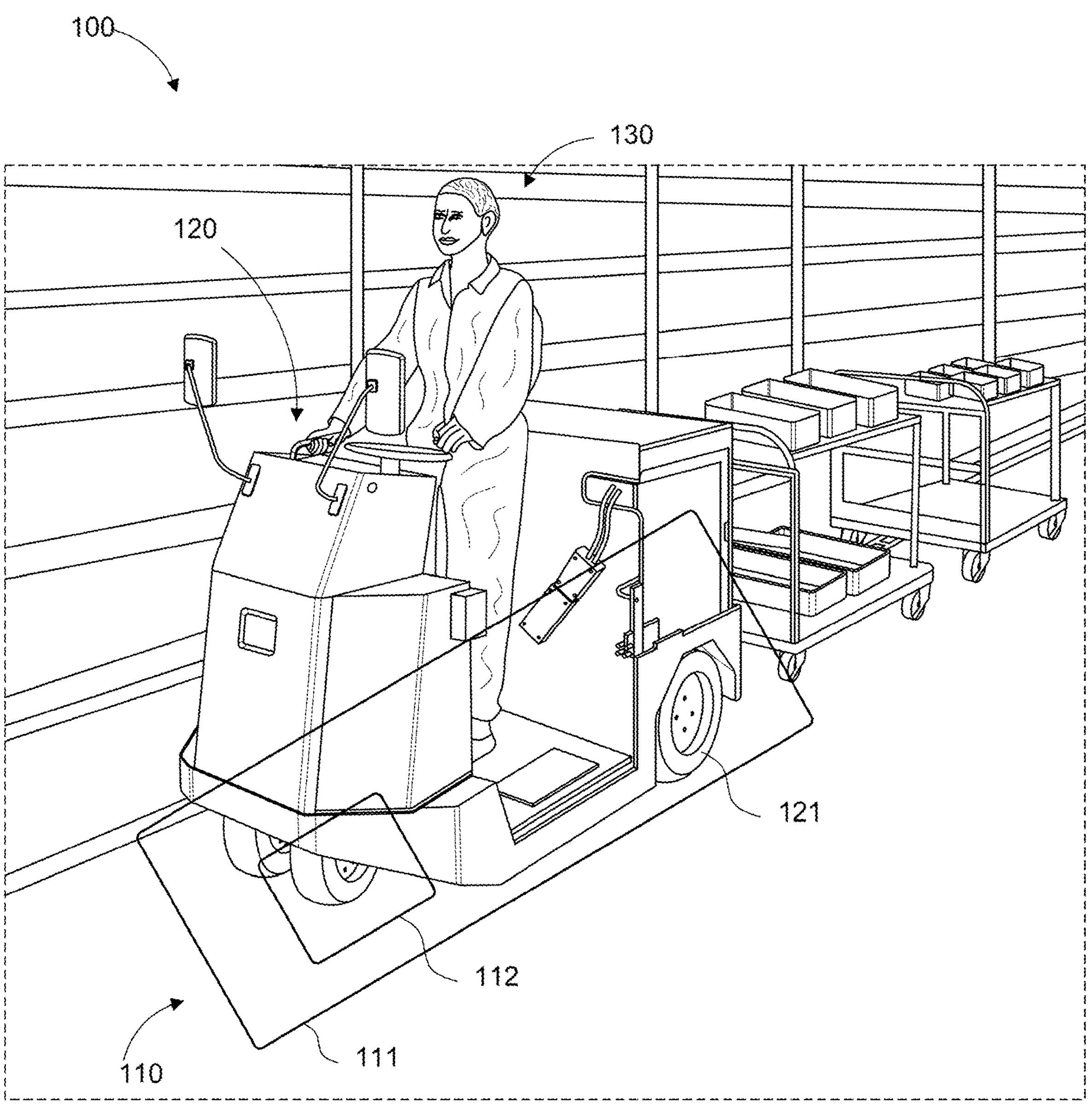
FIG. 1 is an operational example of the docking plate apparatus having a motorized floor conveyor vehicle docked therein, in accordance with an embodiment of the technology disclosed herein.

FIG. 1 illustrates an example environment 100 in which a motorized floor conveyor vehicle, shown as a conveyance tugger 120, is utilizing a docking plate apparatus 110, as disclosed herein. As will be described in greater detail, the docking plate apparatus 110 is distinctly designed with a structure that guides the conveyance tugger 120 to a defined positive stop position, by providing tactile feedback for the driver of the conveyance tugger 120. In the disclosed embodiments, the structure that is described for the docking plate apparatus 110 has dimensions and specifications that are specified for the apparatus 110 to be optimally used with the Toyota® One Touch Deliver System. However, the disclosed docking plate apparatus 110 can be structured using other dimensions and specifications that are not described herein, in order to be used with other types of lifts, loading/unloading systems, and delivery systems without departing from the disclosed functionality and scope of the invention.

FIG. 1 depicts the conveyance tugger 120 as a motorized transportation device that can be used to move large volumes of goods between different areas. As motorized floor conveyor vehicles, such as the conveyance tugger 120, are commonly used in locations that are associated with the supply chain having a high density of product inflows and/or outflows (e.g., logistics facilities, distribution centers, etc.) the example environment 100 is depicted as a warehouse, where the conveyance tugger 120 is being driven by a human operator 130 (also referred to herein as the user). Traditionally in some locations where motorized floor conveyor vehicles are used, such as the warehouse illustrated in FIG. 1, there are lines that are painted on the surface of the floors that are intended to provide visual cues to guide a human operator that is driving the motorized floor conveyor vehicle to predetermined stop position(s). The painted floor lines visually indicate a predetermined stop position for the motorized floor conveyor vehicle, so that the driver sees this line and can appropriately maneuver the vehicle to the corresponding stop position that is determined to be optimal for parking to load/unload the cargo (e.g., pallets) that is being transported. However, using floor lines are a brute-force, unsophisticated, and often times inaccurate means to guide motorized floor conveyor vehicles, such as conveyance tugger 120, to a stop position.

Nonetheless, the aforementioned floor line approach and other traditional guidance means, are subject to several drawbacks. For example, paint can wear away over time, especially on floors of warehouses and other high-traffic locations, which makes the painted floor lines less visible and equally less effective as a visual cues for the human operator of the motorized floor conveyor vehicle. Additionally, even when the floor lines are clearly visible, this approach can be subject to a high likelihood of human error, as it can be difficult for the human operator to accurately maneuver the motorized floor conveyor vehicle to the proper stop position indicated by the floor lines while driving the vehicle (e.g., driving in reverse). Thus, even with these traditional guidance means, including painted floor lines, there may be an inability for the human operator to consistently and accurately position the motorized floor conveyor vehicle in the optimal stop position to interact with unloading/loading systems. To address these problems, the disclosed docking plate apparatus 110 can be employed as a mechanical guidance tool (as opposed to traditional visual approaches) that is particularly structured to guide the wheels 121 of the conveyance tugger 120 and to provide a tactile feedback to the human operator 130 of the conveyance tugger 120 in a manner that ensures that the conveyance tugger 120 stops (or docks) exactly in a stop position that has been deemed optimal for the tugger's 120 interactions with a delivery system, such as the Toyota® One Touch Deliver System.

The example configuration for the docking plate apparatus 110 depicted in FIG. 1 is a plate, or a substantially flat sheet of material that is generally rectangularly (or quadrilateral) shaped, and having rectilinear edges. The material used to construct the docking plate apparatus 110 can be a strong and substantially rigid material such as a steel, other metals, plastic, rubber, and the like, so as to support the weight of a vehicle, namely the conveyance tugger 120, when on top of the apparatus 110 without breaking. The docking plate apparatus 110 is particularly structured as a flat plate in order to allow the apparatus 110 to be placed directly on a surface of a floor, such as the floor of warehouse as depicted in FIG. 1. Accordingly, in operation, a motorized floor conveyor vehicle, like conveyance tugger 120, can easily drive over the flat docking plate apparatus 110 in order to park and/or dock.

The configuration of the docking plate apparatus 110 can be described as comprising a body 111, which is a large flat panel having a substantially rectangular geometry that makes up the largest portion of the plate; and a docking aperture 112 which is a hole through the depth (or thickness) of the plate's body 111, such that the body 111 has a portion that is completely hollowed out near an edge of the plate. In other words, the body 111 has a hole completely through a portion of it, which is the docking aperture 112. The body 111 has a depth, also referred to herein as thickness, that is substantial enough to form a ridge (or raised edge) along the perimeter of the docking aperture 112. Restated, the docking aperture 112 is a hallow opening that is same thickness of the body 111, which creates a raised edge along the docking aperture 112 that has a height that is also equal to the thickness of the body 111.

Further, FIG. 1 illustrates that the docking aperture 112 of the docking plate apparatus 110 is also substantially rectangularly shaped and having dimensions that allow one or more wheels 121 of the conveyance tugger 120 to fit within the aperture's 112 opening when the conveyance tugger 120 is docked in the stop position on top of the docking plate apparatus 110. Additionally, as the wheels 121 of the conveyance tugger 120 fall within the docking aperture 112, the aforementioned raised edge along the perimeter of the docking aperture 112 provides contact friction (e.g., resistance) when the wheels 121 reach the point of touching the edge of the docking aperture 112. This contact friction between the raised edge of the docking aperture 112 and the wheels 121 of the conveyance tugger 120 provides a tactile feedback, similar to a small wall slight pushing back against the forward movement of the tugger's 120 wheels 121, that can be felt and/or perceived by the driver of motorized floor conveyor vehicle, shown in FIG. 1 as the human operator 130. This tactile feedback created by the docking plate apparatus 110, particularly the docking aperture 112, signals to the human operator 131 that the conveyance tugger 120 is currently positioned exactly in the determined optimal stop position to park and/or dock for interaction with the delivery system. The docking plate apparatus 110, as disclosed herein, has additional elements that are described in greater detail below in reference to FIG. 2A and FIG. 2B.

In the operational example shown in FIG. 1, the docking plate apparatus 110 is placed on the floor of the warehouse, and arranged such that the docking aperture 112 of the apparatus 110 is aligned with the determined optimal stop position. In detail, the docking plate apparatus 110 is arranged on the floor such that when the conveyance tugger 120 is docked over the apparatus 110, particularly where the wheels 121 of the conveyance tugger 120 (shown as at least one of the front wheels 121 of the of conveyance tugger 120) are completely within the docking aperture 112, the structure and the dimensions of the apparatus 110 ensures that the conveyance tugger 120 is exactly positioned at the determined stopping that is deemed most optimal for interaction with the delivery system, such as Toyota® One Touch Deliver System. As alluded to above, a determined stop position for the conveyance tugger 120 can be a position and/or location inside of the operational environment 100, for instance the warehouse of FIG. 1, that is deemed optimal with respect to the tugger's 120 interactions with a delivery system. For example, based on the dimensions and configuration of the particular motorized floor conveyor vehicle that is being used in the operating environment 100, for instance whether the vehicle pulls cargo in a train manner or cargo is loaded onto an extended rear of the vehicle, a specific location in the warehouse can be selected as an optimal stop position for the conveyance tugger 120 to be parked/docked. Continuing with this example, a specific location in the warehouse can be selected as the determined position for the conveyance tugger 120 to park/dock, because it allows the delivery system's automated components (e.g., electronic lift) to interact with the sections of the conveyance tugger 120 as intended. Thus, it can be assumed that when the docking plate apparatus 110 is arranged properly on the floor (and secured) with respect to the determined stop position, that the docking aperture 112 is also similarly aligned with the determined stop position such that when the apparatus 110 functions as intended, and the conveyance tugger 120 is parked/docked on top of the apparatus 110, that the wheels 121 of the conveyance tugger 120 are in an exact position which causes the conveyance tugger 120 to also be aligned exactly in the determined stop position.

Furthermore, as human operator 130 is driving the conveyance tugger 120 over the docking plate apparatus 110 for docking, FIG. 1 illustrates that at least one front wheel 121 of the conveyance tugger 120 slightly drop within the opening of the docking aperture 112. As the human operator 130 continues to drive the conveyance tugger 120 forward, the wheels 121 of the conveyance tugger 120 come into contact with the raised edge of the docking aperture 112, particularly where the wheels 121 slightly push against this raised edge, in a manner that causes the human operator 130 to feel this resistance as a form of tactile feedback. Accordingly, the human operator 130 feels this tactile feedback, which is the contact friction between the wheels 121 of the conveyance tugger 120 and the "walls" of the docking plate apparatus 110. This tactile feedback provided by the docking plate apparatus 110 serves as a cognitive signal to the human operator 130 that the conveyance tugger 120 is properly docked on the apparatus 110 and thus the conveyance tugger 120 is currently docked in a position that is exactly aligned with the determined stop position for the tugger 120 to interact with the warehouse's deliver system that is actuated for unloading cargo from the tugger 120, for example. Continuing with this example, after the delivery system is actuated and parts are completely unloaded from the docked conveyance tugger 120, then the human operator 130 can drive the conveyance tugger 120 off of the docking plate apparatus 110 (e.g., undocking) to continue the driving the tugger 120 on the delivery route.

Also, the docking plate apparatus 110 would function in a similar manner in the scenario where the human operator 130 drivers the conveyance tugger 120 in reverse over the docking plate apparatus 110. When the conveyance tugger 120 is being maneuvered in reverse, and the human operator 130 is backing the tugger 120 over the apparatus 110, the rear wheels 121 of the tugger 120 may hit the docking aperture 112 first. In this case, the human operator 130 can continue to drive the conveyance tugger 120 in reverse over the docking plate apparatus 110 until they feel the tactile feedback from the front wheels 121 hitting the "wall" of the docking aperture 112, which signals to the driver that the conveyance tugger 120 is now docked properly on top of the docking plate apparatus 110, and thus the tugger 120 is precisely in the determined stopped position. Accordingly, the docking plate apparatus 110, as disclosed herein, has a distinct structure that ensures that a human operator 130 consistently and accurately parks/docks in the exact stop position that is determined most optimal for operation with the delivery system used in the operational environment, such as the Toyota® One Touch Deliver System. Therefore, the docking plate apparatus 110 can realize other advantages that are associated with such exact positioning of the motorized floor conveyor vehicle, or conveyance tugger 120, including: an improved and more efficient unloading process (e.g., for dollies); a safer and more efficient docking process for the driver of the vehicle (e.g., less repositioning and guess work involved); and less potential of trip hazards.

Figure 2A:
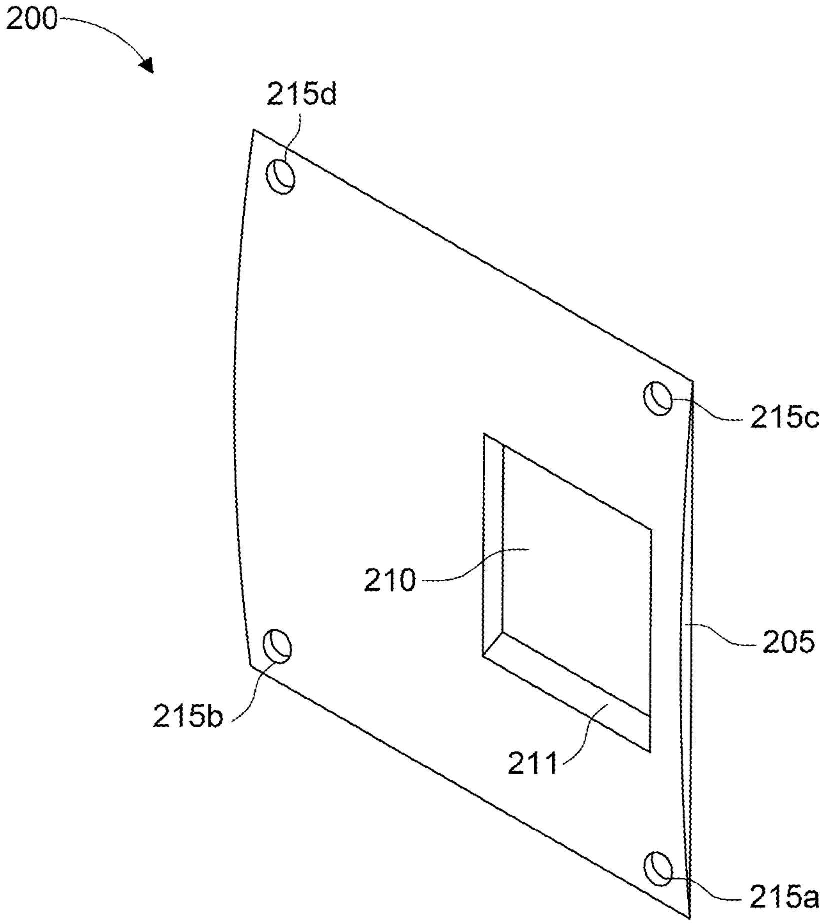
FIG. 2A depicts a schematic of a perspective view of the docking plate apparatus shown in FIG. 1, in accordance with an embodiment of the technology disclosed herein.
Figure 2B:
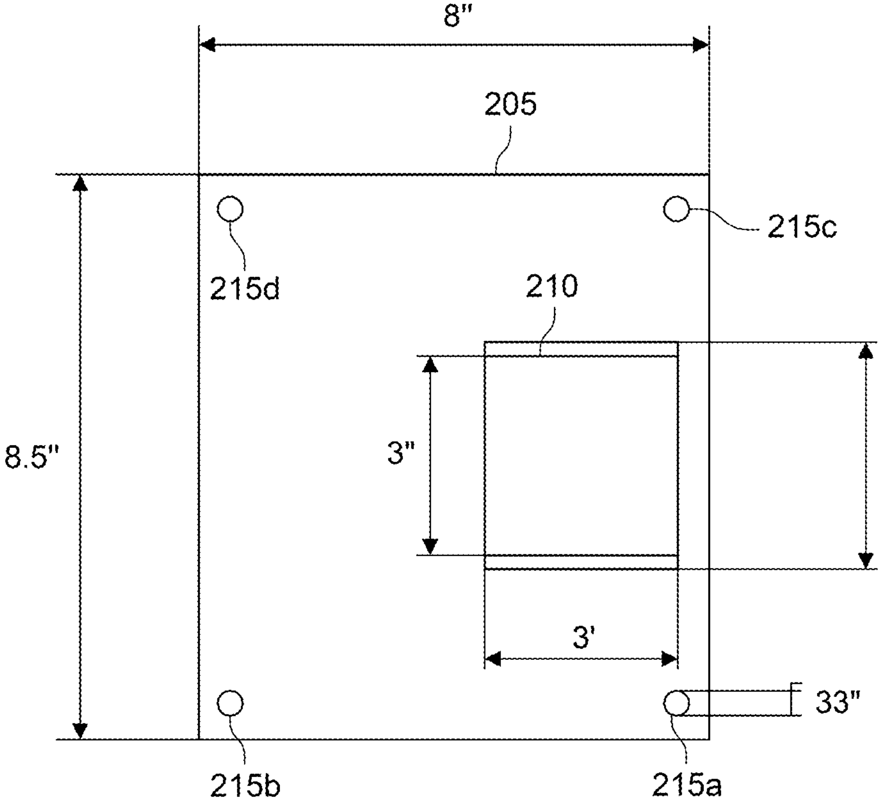
FIG. 2B depicts a schematic of a front view of the docking plate apparatus shown in FIG. 1, in accordance with one embodiment of the systems and methods described herein.

Referring now to FIG. 2A and FIG. 2B, the schematics prominently illustrate the structure and dimensions of the docking plate apparatus 200, as disclosed herein. The dimensions and structure depicted in FIG. 2A and FIG. 2B are designed to be optimal for docking a conveyance tugger in order to specifically interact with the Toyota® One Touch Deliver System. Nonetheless, the example configuration for the docking plate apparatus 200 shown in FIG. 2A and FIG. 2B is an example and not intended to be limiting. Thus, the dimensions, arrangement of elements, and structure for the docking plate apparatus 200 can be altered in order to accommodate other delivery systems that may be used in the supply chain without departing from the scope of the invention. Particularly, FIG. 2A shows a perspective view of the docking plate apparatus 200, and FIG. 2B shows a front view (e.g., top of the apparatus 200 in operation) of the docking plate apparatus 200. In the illustrated example, the docking plate apparatus 200 has a primary member, referred to herein as the body 205. The body 205 is a flat sheeted panel of metal (e.g., steel) and is substantially rectangular in geometric shape, and can be considered to be the "plate" of the apparatus 200. FIG. 2A shows that the body 205 of the apparatus 200 can have a thickness dimension of 0.25 inches (depth). Therefore, the docking plate apparatus 200 is structured to be flat and not extremely thick, so as to allow ease in driving the conveyance tugger over the apparatus 200, in order to be ultimately parked/docked on top of the apparatus 200. However, the docking plate apparatus 200 is structured to have a thickness that is substantive enough to provide a depth that is tactile to a human (e.g., driver of the conveyance tugger) when wheels contact the apparatus 200 (particularly the docking aperture 210 portion). FIG. 2B shows that the body 205 also has dimensions of 8.5 inches (length) and 8 inches (width).

FIG. 2A and FIG. 2B also illustrate that the structure of docking apparatus 200 can include several fastener apertures 215*a*-215*b*. The fastener apertures 215*a*-215*b* are openings through the entire depth of a portion of the body 205 that allow fastening means, such as screws, to be used to stably secure the apparatus 200 to a surface (e.g., floor) into an exact position. For example, once the docking plate apparatus 200 is aligned with the determined stop position for the conveyance tugger, and positioned on the warehouse floor, screws can be inserted through each of the fastener apertures 215*a*-215*b* to install this apparatus in this exact position, and secure it place so that there is no unintended displacement (e.g., sliding) over time while the apparatus is being used (as vehicles are driven over and/or docked on top of the apparatus 200). As seen in FIG. 2A and FIG. 2B, each of the fastener apertures 215*a*-215*b* are positioned in a respective corner of the apparatus' body 205.

The structure of the docking plate apparatus 200 also has a docking aperture 210, which is a hole, or opening, through a portion of the body 205 (or plate) of the apparatus 200. As seen, the docking aperture 210 is substantially square in geometric shape and positioned within a sectioned half of the apparatus 200. For instance, FIG. 2B shows that docking aperture 210 is structured in a "right" half of the body 205 of the apparatus 200. FIG. 2A illustrates that the docking aperture 210 has a thickness that is the same as the body 205, meaning that the opening is completely hollowed through that portion of the plate. Accordingly, FIG. 2A illustrates a raised edge 211, also called the apparatus' 200 "wall", that is formed around the perimeter of the docking aperture 210. As previously described, in operation, when wheels of the conveyance tugger drops inside of the docking aperture 210, the raised edge 211 forms a "wall" around the wheels such that if the wheel presses against any side of the raised edge 211 inside of the docking aperture 210 then contact friction provides a form a tactile feedback that can be perceived by a human, such as the driver of the conveyance tugger, to signal that the tugger is properly docked on top of the docking plate apparatus 200 and thus is parked/docked in the determined stop position that is deemed optimal for the delivery system that is being utilized. FIG. 2A shows that the docking aperture 210 has a thickness dimension of 0.25 inches. FIG. 2B shows that the docking aperture 210 also has dimensions of 3 inches (length) and 3 inches (width). In this embodiment, the dimensions of the docking aperture 210 allows at least one wheel of a conveyance tugger to be within this opening, and "walled" in by the raised edge 211.

Figure 3:
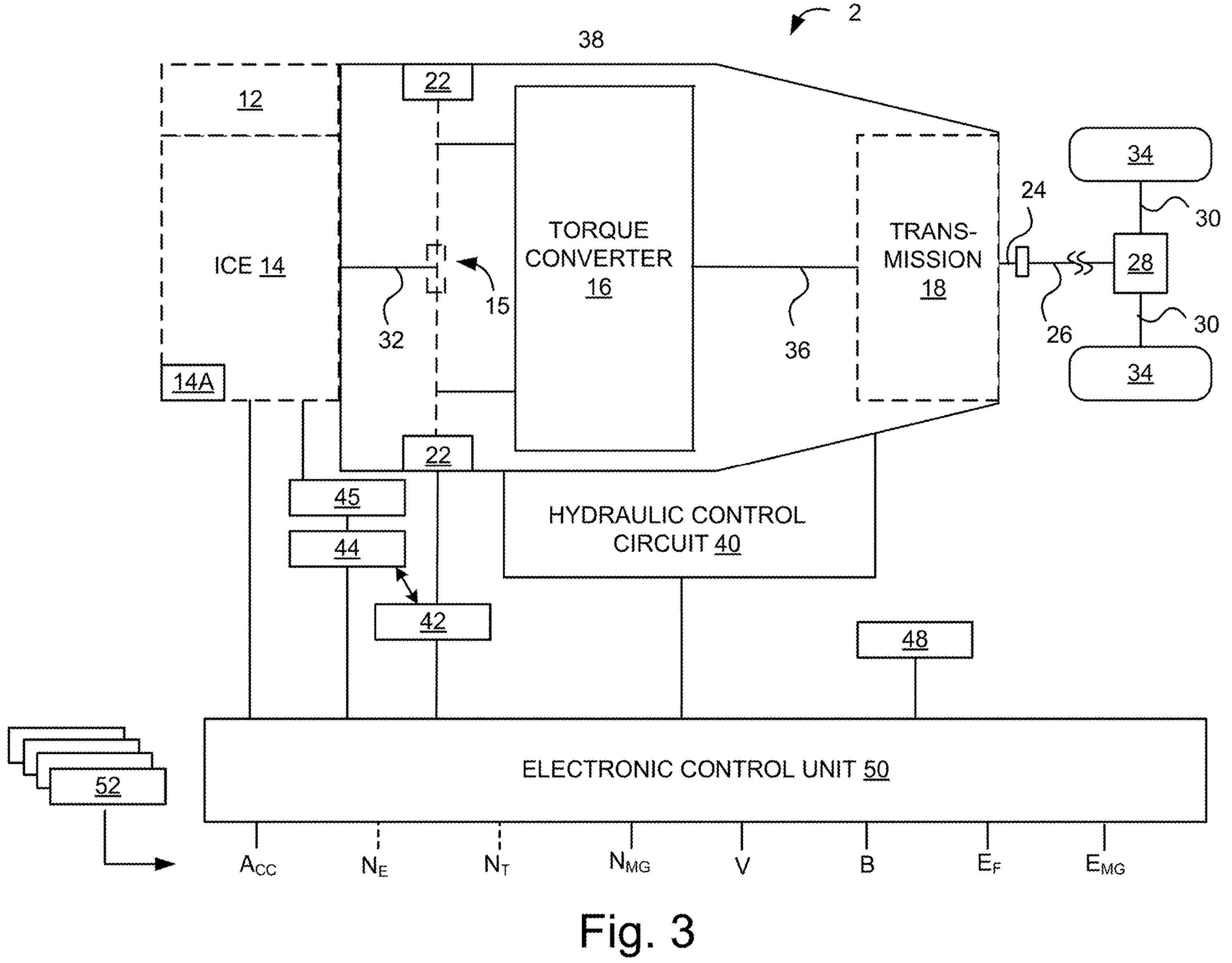
FIG. 3 is a schematic representation of an example motorized vehicle, such as conveyance tugger, with which embodiments of the docking plate apparatus disclosed herein may be implemented.

An example vehicle 102 in which embodiments of the disclosed technology may be implemented is illustrated in FIG. 3. That is, the vehicle 102 is general configuration of a motorized vehicle, that may be substantially similar to the architecture of motorized floor conveyor vehicles, such as conveyance tuggers, as disclosed herein. FIG. 3 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 3, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, N T (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc. Sensors 52 may also include camera, LIDAR, and other sensor types configured to detected environmental conditions external to a vehicle. For instance, camera sensors may be configured to detected an obstacle in the path of the vehicle.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

FIG. 3 is provided for illustration purposes only as an example of a vehicle system with which embodiments of the disclosed technology may be implemented. One of ordinary skill in the art reading this description will understand how the disclosed embodiments can be implemented with various different vehicle platforms including motorized floor conveyor vehicles, such as conveyance tuggers.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus comprising:

a unitary plate comprising an arched top surface and a flat bottom surface that directly contacts a surface of a floor; and a docking aperture defined by four walls to form an opening in the unitary plate, the docking aperture configured to receive and hold a wheel of a motorized floor conveyor vehicle in a determined stop position on the floor, wherein upon receiving the wheel, at least one of the four walls contact the received wheel.

2. The apparatus of claim 1, wherein the docking aperture is surrounded by a raised edge along a perimeter of the docking aperture.

3. The apparatus of claim 2, wherein the at least one of the four walls contact the received wheel when the received wheel is moved from the unitary plate into the docking aperture.

4. The apparatus of claim 3, wherein at least a portion of the raised edge contacts the received wheel and the docking aperture contains an entire width of the received wheel.

5. The apparatus of claim 4, wherein friction between the raised edge and the at least one of the four walls maintains the at least one or more four walls in contact with the raised edge.

6. The apparatus of claim 1, further comprising one or more fastener apertures structured on the unitary plate.

7. The apparatus of claim 6, further comprising a fastening means securely fitted to the one or more fastener apertures to secure the unitary plate to the floor.

8. The apparatus of claim 1, wherein the motorized floor conveyor vehicle comprises a conveyance tugger.

9. The apparatus of claim 1, wherein the unitary plate has dimensions comprising at least 8.5 inches in length and at least 8 inches in width.

10. The apparatus of claim 9, wherein the docking aperture has dimensions comprising at least 3 inches in length and at least 3 inches in width.

11. The apparatus of claim 10, wherein the docking aperture extends through an entire thickness of the unitary plate from a raised edge portion of a top surface of the unitary plate to the floor.

12. The apparatus of claim 10, wherein the docking aperture and the unitary plate have dimensions comprising at least 0.25 inches in thickness.

13. A system comprising:

a motorized floor conveyor vehicle having wheels; and a docking plate apparatus comprising:

a unitary plate comprising an arched top surface and a flat bottom surface that directly contacts a surface of a floor; and a docking aperture defined by four walls to form an opening in the unitary plate, the docking aperture configured to receive and hold a wheel of the wheels of the motorized floor conveyor vehicle in a determined stop position on the floor, wherein upon receiving the wheel, at least one of the four walls contact the received wheel.

14. The apparatus of claim 1, wherein a thickness of the unitary plate, measured from the flat bottom surface to the arched top surface, is variable.

15. The apparatus of claim 1, wherein the docking aperture has a nonuniform height.

16. The apparatus of claim 1, wherein the docking aperture has same width and length dimensions.

17. The apparatus of claim 7, wherein the fastening apertures are positioned adjacent to four corners of the unitary plate.

18. The apparatus of claim 1, wherein the docking aperture is centered at an offset position within the unitary plate, the offset position being offset from a vertical bisecting line or a horizontal bisecting line of the unitary plate.

19. The apparatus of claim 1, wherein two walls of the four walls have a uniform height and other two walls of the four walls have a nonuniform height.

20. The apparatus of claim 1, wherein a thickness of the docking aperture or of the unitary plate is less than ten percent of width or length dimensions of the docking aperture.

* * * * *